United States Patent [19]
Krofchak

[11] 3,965,243
[45] June 22, 1976

[54] RECOVERY OF SODIUM THIOCYANATE

[75] Inventor: David Krofchak, Cambridge, Canada

[73] Assignee: David Krofchak Limited, Cambridge, Canada

[22] Filed: Sept. 10, 1974

[21] Appl. No.: 504,776

[30] Foreign Application Priority Data
Sept. 11, 1973 United Kingdom............... 42551/73

[52] U.S. Cl................................ 423/226; 423/223; 423/229; 423/355; 423/366; 423/428; 423/437; 423/563; 210/21

[51] Int. Cl.²..................... B01D 53/34; C01C 3/20

[58] Field of Search ........... 423/180, 181, 221, 428, 423/563, 194, 365, 229, 437, 366, 658.5, 355, 220, 223, 224, 226, 571, 573; 210/21

[56] References Cited
UNITED STATES PATENTS

| | | | |
|---|---|---|---|
| 1,570,047 | 1/1926 | Darrin................................ | 423/366 |
| 2,386,985 | 10/1945 | Shaw.................................. | 423/514 |
| 2,621,108 | 12/1952 | Hill et al............................ | 423/366 |
| 3,652,203 | 3/1972 | Nakamura et al.................. | 423/366 |

FOREIGN PATENTS OR APPLICATIONS

| | | | |
|---|---|---|---|
| 17,302 | 1/1930 | United Kingdom................. | 423/366 |
| 948,270 | 1/1964 | United Kingdom................. | 423/226 |
| 199,123 | 10/1967 | U.S.S.R............................. | 423/366 |

Primary Examiner—Earl C. Thomas
Attorney, Agent, or Firm—Frank I. Piper; Robert F. Delbridge; Arne I. Fors

[57] ABSTRACT

A process is described whereby accumulated impurities, consisting mainly of sodium tiocyanate are continuously removed from scrubbing liquors used for removal of hydrogen sulphide from fuel gases and the liquors thereby regenerated and re-used in the hydrogen sulphide scrubbing operation. The thiocyanate is removed by contacting the used scrubbing liquor with an organic solvent, e.g. n-butanol, separating the thiocyanate-bearing solvent from the scrubbing liquor, re-using the treated scrubbing liquor, recovering the thiocyanate from the solvent and re-using the solvent. The extracted sodium thiocyanate can be converted to pure, saleable chemicals or converted to an alkali which can be re-used in the absorbing liquors, thereby producing a completely closed system with no effluent.

5 Claims, 1 Drawing Figure

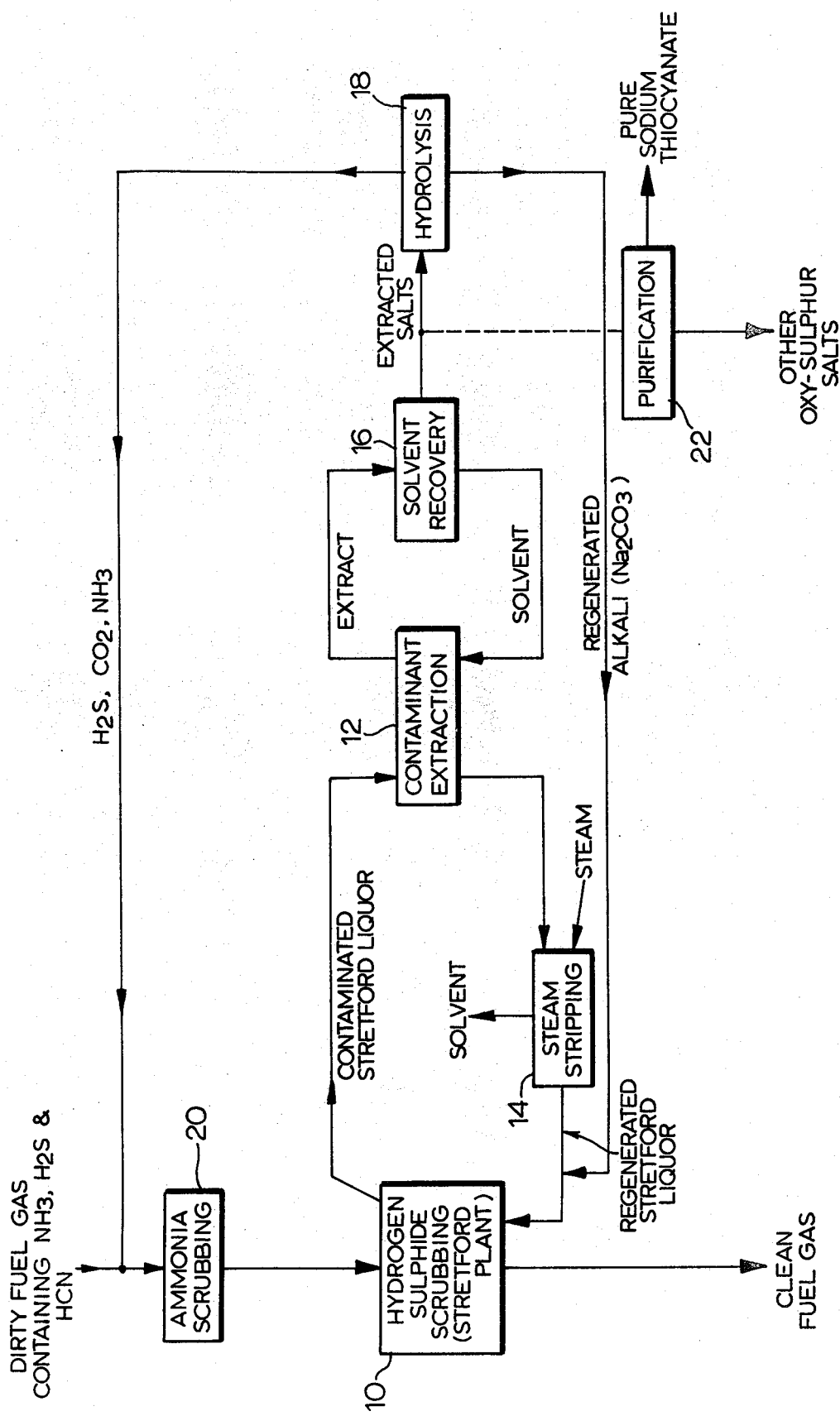

RECOVERY OF SODIUM THIOCYANATE

This invention relates to the regeneration of aqueous scrubbing liquor used in removal of hydrogen sulphide from fuel gases which also contain hydrogen cyanide. More particularly, the invention is concerned with selective removal of accumulated sodium thiocyanate from the used liquor by extraction with an organic solvent.

Many fuel gases contain hydrogen sulphide which must be removed before the gases are burned in order to prevent discharge of noxious fumes of sulphur dioxide in the combustion products. Hydrogen sulphide is usually removed by washing the gas in an absorbing solution, which is then passed to a separate regeneration operation where, by application of heat or other means, the hydrogen sulphide is removed from the absorbing solution, which can then be re-used for washing the gas. Normally, the solutions used can be regenerated indefinitely in this way. Typical hydrogen sulphide scrubbing solutions used are ethanolamines, sodium thioarsenate, sodium carbonate and an alkaline solution of 2.7 anthraquinone disulphonic acid and sodium vanadate, known as "Stretford liquor". The Stretford process was developed in the Stretford laboratory by the North West Gas Board and the Clayton Analine Co of England. It removes the hydrogen sulphide at a high efficiency rate using water soluble, stable chemicals.

Some fuel gases such as coke over gas contain, in addition to hydrogen sulphide, hydrogen cyanide which is a similar acid gas that is very difficult to remove separately from hydrogen sulphide. However, if the hydrogen cyanide is not removed, it reacts with alkaline compounds in hydrogen sulphide absorbing solution to form a thiocyanate, usually sodium thiocyanate, which cannot be removed from the solution by conventional regeneration techniques; it therefore accumulates in the absorbing solution until eventually the solution has to be discarded. Since thiocyanates are biologically offensive, the discarded solution must be specially processed, usually by incineration, which destroys not only the thiocyanates, but also the valuable chemicals remaining in the absorbing solution.

It is possible to remove hydrogen cyanide by scrubbing the gases, e.g. with a mixture of sulphur and water, before they enter the hydrogen sulphide scrubbing operation, but this process is not 100% efficient with the result that the hydrogen sulphide absorption liquors still become spent (only more slowly) because of sodium thiocyanate build-up. Furthermore, hydrogen cyanide scrubbing required addition equipment and still produces an offensive thiocyanate effluent which must be destroyed.

In addition to the problems caused by the hydrogen cyanide, other side reactions may occur in the scrubbing operation which result in the formation of complex sulphur compounds such as sodium thiosulphate which also tend to build up in hydrogen sulphide scrubbing liquors.

My invention is a process whereby accumulated impurities consisting mainly of sodium thiocyanate, with some sodium thiosulphate and other oxy-sulphur compounds, can be continuously removed from absorbing liquors used for removal of hydrogen sulphide from fuel gases and the liquors thereby regenerated and re-used in the hydrogen sulphide scrubbing operation. The extracted sodium thiocyanate can be converted to pure, saleable chemicals, or converted to an alkali which can be re-used in the absorbing liquors, thereby producing a completely closed system with no effluent.

In general, the process involves contacting the used scrubbing liquor with an organic extractant for sodium thiocyanate, separating the thiocyanate bearing organic extractant from the aqueous liquor and recycling the liquor to the gas scrubbing operation. The extracted sodium thiocyanate is separated from the organic extractant which is then re-contacted with the used scrubbing liquor. The organic extractant which is employed in the process may be any aliphatic compound having between 3 and 8 carbon atoms, preferably alcohols and more preferably n-butanol.

In a preferred application, the process is utilized for the regeneration of the coke over gas scrubbing solution known as Stretford liquor and this application is described in detail hereinbelow with reference to the accompanying drawing.

Referring to the drawing, a portion of the Stretford absorbing solution being used in hydrogen sulphide scrubbing operation 10 is transferred to contaminant extraction step 12, where it is contacted with an organic solvent. This solvent removes some of the sodium thiocyanate and other oxy-sulphur compounds from the absorbing solution which, after treatment in steam stripping step 14 to remove entrained solvent, is returned to the hydrogen sulphide scrubbing operation 10. The solvent, containing the extracted sodium thiocyanate, passes to solvent recovery step 16 where the solvent is separated from the sodium thiocyanate, and recycled to the contaminant extraction step 12.

The separated sodium thiocyanate is then hydrolyzed with steam (step 18) to produce sodium carbonate, which is re-returned to the Stretford absorbing solution. The gases evolved in the hydrolysis, namely, ammonia, hydrogen sulphide and carbon dioxide, are indigenous to the coke oven gas, and are returned to the gas stream prior to the ammonia scrubbing step 20.

Alternatively, the recovered sodium thiocyanate may be recrystallized to make a pure chemical for sale (step 22).

The preferred solvent for use in contaminant extraction step 12 is n-butanol. However, any aliphatic compound containing between 3 and 8 carbon atoms including alcohols, ketones and glycols may be used. The preferred solvents are those members of the aforesaid group having the lowest number of carbon atoms and which are not miscible with water in all proportions, and the highest member of such homologous series that is miscible in all proportions with water.

EXAMPLE 1

40 ml of Stretford liquor containing 300 gpl sodium thiocyanate and 120 gpl other salts were mixed with 40 ml of n-butanol and allowed to settle. The upper (butanol) layer was 59 ml and the water layer 21 ml. On evaporating to dryness, the butanol layer left a residue of 7 grams, analyzing approximately 85% sodium thiocyanate — this represented an extraction of 50% of the thiocyanate contained in the original liquor.

EXAMPLE 2

The experiment in Example 1 was repeated using n-amyl alcohol. The upper layer was 48 ml and the lower 32 ml. 3 grams of sodium thiocyanate were recovered, representing a recovery of 25%.

EXAMPLE 3

100 ml of Stretford liquor containing 330 gpl sodium thiocyanate and 150 gpl other salts were mixed with 90 ml of ethyl acetate and allowed to settle. The upper layer was 90 ml, the lower 100 ml. 5.5 grams of sodium thiocyanate were recovered from the upper layer representing a recovery of 15%.

EXAMPLE 4

Similar results to the above tests were obtained with 2-propanol and methyl ethyl ketone.

The above examples indicate that n-butanol is more efficient for extracting the sodium thiocyanate than other solvents tested. This is because the thiocyanate salt increases the solubility of water in butanol, which, in turn, increases the solubility of thiocyanate in the butanol layer in a synergistic effect. This effect results because butanol is somewhat miscible with water and it has been found that butanol saturated with water, i.e. containing 20% water, will dissolve 5 times as much sodium thiocyanate as pure butanol. The upper layers in extraction tests have been found to contain as much as 40% water when sodium thiocyanate is present. A secondary benefit of this water is that the solvent extracts limited quantities of other salts from the Stretford liquor instead of being completely selective for sodium thiocyanate.

In contrast, solvents such as ethyl acetate or n-amyl alcohol, which are completely immiscible with water, have a lower carrying capacity for sodium thiocyanate but are very selective and remove only sodium thiocyanate.

Solvents miscible with water, such as 2-propanol, produce a very large volume of solvent/water mixture for recovery. These solvents are technically suitable but may not be economically viable.

The extraction of the sodium thiocyanate may be carried out in any known liquid extraction apparatus. It is preferred to carry it out in a countercurrent continuous extractor having about 4 theoretical stages and using about 0.1 to about 10, preferably about 1.5 volumes of solvent per volume of liquor. The extract-solvent ratio and number of stages is dependent on the type of equipment and the composition of the solvent and the liquor being treated and can be determined by the established principles of chemical engineering.

The solvents used are easily separated from the water phase by distillation which is the preferred method of separation. For example, in the case of the preferred solvent, n-butanol, the extract is passed to a distillation tower where the butanol is distilled off as a low-boiling azeotrope containing 42.5% water. The condensed azeotrope is separated into a butanol-rich layer containing 80% butanol and a water-rich layer containing 6% butanol in a decanter. The water layer is refluxed to the distillation tower from which an aqueous solution of sodium thiocyanate, substantially free of butanol is removed at the bottom. The wet butanol layer may be re-used in the extraction process, or processed in a second distillation tower from which pure butanol is removed at the base and azeotrope at the top.

The aqueous layer from the extraction process contains a small amount of butanol which is recovered in a steam stripping step 14 by passing down a tower up which steam is flowing. The steam flow removed substantially all the butanol and is condensed and decanted with the main solvent stream.

Other methods of recovery of solvents, such as crystallization or liquid extraction may be used if economically justified.

Hydrogen cyanide introduced into the Stretford liquor consumes sodium carbonate which is added to the liquor to maintain alkaline conditions.

$$Na_2CO_3 + 2HCN + 2S \rightarrow 2\,NaCNS + CO_2 + H_2O$$

Thus, sodium carbonate equivalent to the thiocyanate produced must be added to the Stretford liquid.

I have found that the sodium thiocyanate extracted in the process can be converted back to the carbonate by hydrolysis of molten sodium thiocyanate with steam at a temperature of 550°–800°F.

$$2NaCNS + 5H_2O \rightarrow Na_2CO_3 + 2NH_3 + 2H_2S + CO_2$$

EXAMPLE 5

150 g of sodium thiocyanate was melted in a flask at 600°F. and steam passed over the molten bath at a rate of 280 g/hr for 1-½ hours. The evolved gases were identified as ammonia and hydrogen sulphide. The residue in the flask was cooled and dissolved in water, and analysis of the solution showed that 46% of the thiocyanate had been consumed; titration of the solution showed an equivalent quantity of alkali had been produced.

Because the product of reaction, sodium carbonate, is solid in the range 550°–800°F., the reaction can only be carried to completion with difficulty. However, the carbonate and thiocyanate are easily separated by extracting the thiocyanate from the solid residue with butanol or other solvent as used in step 12, leaving the sodium carbonate for re-use in the Stretford liquor.

The reaction of the steam with the salt may be carried out in known chemical processing equipment, either by dispersing the molten salt in the gas, as in a spray dryer, or by dispersing the gas in the liquid, as in a sprayed liquid reactor, stirred tank, perforated plate tower, or similar equipment.

Since pure sodium thiocyanate is a commercial product, if desired this product may be made from the extracted thiocyanate as follows: The aqueous thiocyanate solution, after removal of the butanol used in the extraction process is concentrated, filtered and decolourized with activated carbon. The solution is then further evaporated to crystallize the salt, mainly sodium thiocyanate. This salt is dried, either in an oven or by solvent washing, dissolved in pure butanol, filtered and recrystallized and the product salt is dried at about 160°C.

EXAMPLE 6

Crude salt yellow in colour was produced as described above and was found to be 88% sodium thiocyanate. After recrystallization and drying as described, the pure white salt analyzed 99% sodium thiocyanate.

In addition to producing a pure sodium thiocyanate, purification step 22 also enables other contaminating salts such as sodium thiosulphate or sodium sulphate, contained in the Stretford liquor, to be removed from the system for disposal. It should be noted, however, that removal of sodium thiosulphate from the circuit is not an essential requirement of the process. In fact, once the sodium thiocyanate is removed from the solution, sodium thiosulphate in the recycled solution will be converted to sodium thiocyanate by reaction with hydrogen cyanide in the gas entering the hydrogen sulphide scrubbing operation 10. This reaction is believed to be as follows:

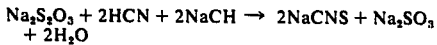

$$Na_2S_2O_3 + 2HCN + 2NaCH \rightarrow 2NaCNS + Na_2SO_3 + 2H_2O$$

Thus, if the sodium thiosulphate is returned to the $H_2S$ scrubber circuit, since it is converted to sodium thiocyanate, the sodium thiocyanate level will be controlled automatically as long as the NaCNS is continually removed.

The process of the invention has the following advantages over known methods of handling alkali thiocyanate contaminated hydrogen sulphide scrubbing liquors:

1. It enables continuous, indefinite regeneration of the scrubbing liquor.
2. It extracts only contaminants without destroying the useful components of the scrubbing liquor.
3. It provides for recycle of the extracted contaminants to the process with very little or no by-product to dispose of.
4. It is a low-temperature, low-pressure process.
5. It eliminates the need for a hydrogen cyanide scrubbing operation prior to $H_2S$ scrubbing and the noxious effluent associated with this operation.

What I claim as new and desire to protect by Letters Patent of the United States is:

1. A process for the regeneration of an aqueous alkaline scrubbing liquor which has been used for removal of hydrogen sulphide from fuel gas and which contains alkali thiocyanate which comprises contacting at least a portion of said liquor with an organic extractant for said alkali thiocyanate, said extractant consisting essentially of n-butanol, separating the aqueous phase comprising scrubbing liquor of reduced alkali thiocyanate content from the alkali thiocyanate bearing organic extractant, recycling said liquor of reduced alkali thiocyanate content for re-use as gas scrubbbing liquor, separating alkali thiocyanate from said alkali thiocyanate bearing organic extractant to regenerate said extractant and recycling said regenerated extractant to treat additional used scrubbing liquor.

2. The process according to claim 1, wherein the used liquor is an alkaline solution of 2:7 anthraquinone disulphonic acid and sodium vanadate and the alkali thiocyanate is sodium thiocyanate.

3. The process according to claim 1 in which the extracted alkali thiocyanate is sodium thiocyanate which is hydrolyzed in a molten state with steam at 500°–800°F. to produce sodium carbonate and gases which are returned to the fuel gas being treated, the residue from said hydrolysis operation is extracted with solvent to remove unconverted sodium thiocyanate, and the sodium carbonate is returned with the recycled scrubbing liquor of reduced alkali thiocyanate content.

4. The process according to claim 1, in which at least some of the extracted alkali thiocyanate is filtered, passed through activated carbon, crystallized, dried, dissolved in solvent, filtered, recrystallized and dried to produce pure sodium thiocyanate and to remove other salts from the system.

5. The process according to claim 1 in which the scrubbing liquor is Stretford liquor and the fuel gas is coke oven gas.

* * * * *